United States Patent [19]

Hayashi et al.

[11] Patent Number: 4,583,625
[45] Date of Patent: Apr. 22, 1986

[54] TEMPERATURE RESPONSIVE FLUID COUPLING DEVICE

[75] Inventors: Masaharu Hayashi; Masato Itakura, both of Toyota, Japan

[73] Assignee: Aisin Seiki Kabushiki Kaisha, Kariya, Japan

[21] Appl. No.: 655,615

[22] Filed: Sep. 28, 1984

[30] Foreign Application Priority Data

Sep. 28, 1983 [JP] Japan .................. 58-151241[U]

[51] Int. Cl.⁴ ................ F16D 35/00; F16D 43/25
[52] U.S. Cl. .................... 192/58 A; 123/41.12; 123/41.49; 192/82 T; 192/110 B
[58] Field of Search .............. 123/41.11, 41.12, 41.49; 192/82 T, 58 A, 110 B, 110 R

[56] References Cited

U.S. PATENT DOCUMENTS 3,970,177  7/1976  Garrett et al. .............. 192/110 B
3,983,981  10/1976  Snodgrass et al. ............ 192/82 T
4,310,085  1/1982  LaFlame .................... 192/82 T Primary Examiner—William A. Cuchlinski, Jr.
Attorney, Agent, or Firm—Sughrue, Mion, Zinn, Macpeak and Seas

[57] ABSTRACT

A temperature responsive coupling device for driving a cooling fan of an internal combustion engine includes a shaft rotatably mounted in an output coupling member coaxially with an input coupling member which is operatively coupled to the output coupling member by means of a coupling. A bimetal spring is operatively connected to one end of the shaft and a valve plate is connected to the opposite end of the shaft for controlling the flow of fluid within the fluid coupling. The shaft is supported in the output coupling member by means of a sealed bearing in order to decrease the sliding torque produced by the rotation of the shaft. A cover plate is positioned in front of the sealed bearing to protect the bearing from moisture and openings are operatively associated with the cover plate to allow any moisture which might have entered between the cover plate and the bearing to be expelled by centrifugal force.

5 Claims, 4 Drawing Figures

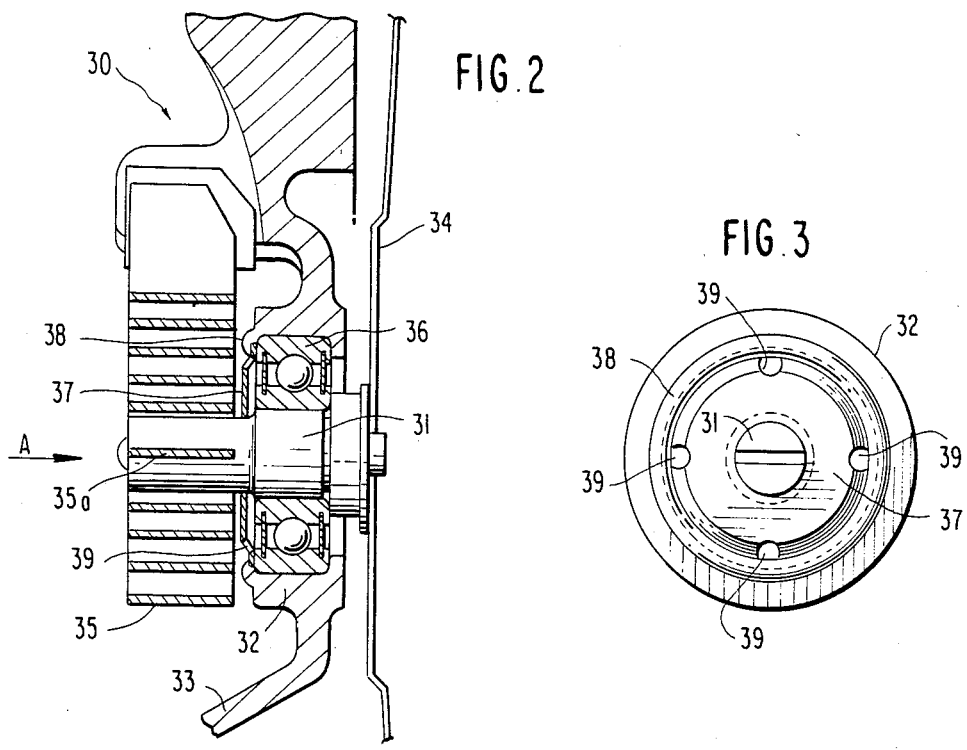
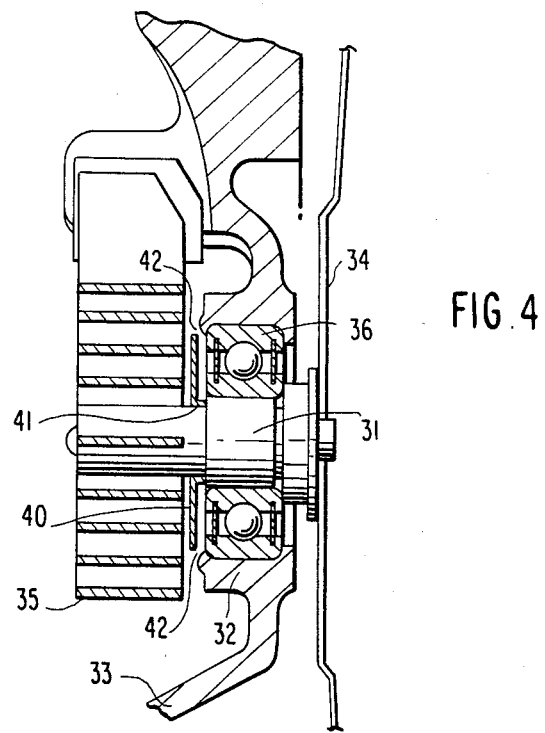

TEMPERATURE RESPONSIVE FLUID COUPLING DEVICE

BACKGROUND OF THE INVENTION

The present invention is directed to a temperature responsive fluid coupling device of the type having a fluid medium for transmitting torque between relatively rotatable input and output coupling members and more specifically to a sheer type fluid coupling device wherein the amount of the fluid medium transmitting torque between the rotatable members can be varied in response to changes in temperature by means of a bimetal spiral spring to thereby vary the speed of the output member. Fluid couplings of this type are used in driving different kinds of load devices and are particularly used for driving a cooling fan device for an internal combustion engine.

A conventional fluid coupling device of this type is disclosed, for example, in Japanese utility model laid open publication No. 55-115445. FIG. 1 of the present application shows the basic construction of this conventional fluid coupling device 10 which includes an input coupling member 11 adapted to be driven by an engine (not shown) and an output coupling member 12 to which a cooling fan (not shown) may be secured. The output coupling member 12 is rotatably mounted on the input coupling member 11 by a suitable bearing 13, disposed therebetween. A rotor 14 is secured to the coupling member 11 in the form of a shaft by suitable spline means. The output coupling member 12 is in the form of a housing having a hollow interior which is divided into a working chamber 16 and a reservoir chamber 17 by means of a partition plate 15 in the form of a disc. The rotor 14 is disposed in the working chamber 16 and a viscous fluid, such as a silicon oil, is circulated between the reservoir chamber and the working chamber. Adjacent surface portions of the rotor 14 and the output coupling member 12 are provided with torque transmitting elements comprised of a pluralitly of cooperating grooves and projections which generally form a labyrinth L. The partition plate 15 is provided at the outer circumference portion thereof with a fluid return passage or hole 18 through which the viscous fluid is permitted to flow from the reservoir chamber 17 to the working chamber 16. The output coupling member 12 is provided with a pumping passage or hole 19 through which the viscous fluid can be transferred from the working chamber 16 to the reservoir chamber 17 by means of a discharge force generated by a pumping projection P. A rod or stub shaft 20 is rotatably supported concentrically with the input and output coupling members 11 and 12. A valve plate 21 is connected to one end of the shaft 20 and is positioned against the partition plate 15 and a bimetal spiral spring 22 is connected to the other end of the shaft 20 on the front side surface of the output coupling member 12. The valve plate 21 will be rotated on the partition plate 15 by the expansion and contraction of the bimetal spring 22 which is subjected to changes in the temperature of the radiator air. Therefore, the fluid return passage 18 can be controlled to be opened and closed by the valve plate 21, thereby controlling the flow of viscous fluid from the reservoir chamber 17 to the working chamber 16.

The shaft 20 is rotatably supported by a bushing 23 which in turn is supported by the front side wall 25 of the output coupling member 12. A pair of O-rings 24 of synthetic rubber material are disposed between the shaft 20 and the bushing 23 so as to prevent the escape of fluid from the reservoir chamber 17 by leaking along and around the shaft 20. However, during the rotation or axial sliding movement of the shaft 20, a reaction is produced by friction to increase rotating and the sliding torque of the rod 20.

When the engine temperature is low, the fluid return passage 18 is closed by the valve plate 21 to thereby prevent the fluid flow from the reservoir chamber 17 to the working chamber 16. At this time the fluid can be transferred from the working chamber 16 to the reservoir chamber 17 by means of the discharge action of the pumping projection P. Therefore, due to the small quantity of fluid remaining in the working chamber 16, the rotational speed of the output coupling member 12 is maintained at a very low level whereby the cooling fan is driven at a slow speed. Under such operating conditions the coupling is considered to be in the OFF condition. When the engine temperature rises and reaches a predetermined value, the bimetal spring 22 will actuate the valve plate 21 through the shaft 20 to thereby open the fluid passage 18, permitting the fluid to flow from the reservoir chamber 17 to the working chamber 16. Therefore, due to an increase in the amount of fluid in the working chamber 16, the rotational speed of the output coupling member 12 will increase to drive the cooling fan at a faster speed. Under such an operating condition, the coupling is considered to be in the ON condition.

Since the shaft 20 is rotatably supported by the bushing through the O-rings 24, the O-rings 24 will slide on the bushing 23 and a sliding torque is produced between the O-rings 24 and the bushing 23. Therefore, due to the sliding torque, the response to temperature changes decreases when the fluid coupling device changes from the OFF condition to the ON condition when the temperature rises to thereby increase the thermal hysteresis of the coupling device which shows the difference between the temperature when the coupling device is changed from the OFF condition to the ON condition on the rise of the temperature, and the temperature when the coupling device is changed from the ON condition to the OFF condition on the fall of the temperature.

In order to decrease the sliding torque produced by the rotation of the shaft 20, it has been suggested to support the shaft 20 on the front side wall of the output coupling member 12 through a sealed bearing. According to such an arrangement, the sealed bearing would be mounted on the front side wall with the seal plate of the bearing exposed to the outside. As a result, the seal plate, especially the lip seal portion, will be susceptible to deterioration by moisture and salts which may enter the engine compartment through the front grill and the radiator core fin. Since the moisture and the salts may enter into the bearing, the interior of the bearing will gather rust, especially when the car is stopped for a long period of time. Since the coupling device is maintained in OFF condition when the car is stopped, the rusting of the bearing will cause the bearing to lock up and prevent the valve plate from rotating on the partition plate when the engine is subsequently started. As a result, the coupling device can not be shifted to the ON condition, thereby placing the engine in danger of overheating.

SUMMARY OF THE INVENTION

The present invention provides a new and improved temperature responsive fluid coupling device which eliminates the disadvantages of the prior art temperature responsive fluid coupling devices discussed above.

More specifically, the present invention provides a new and improved temperature responsive fluid coupling device which includes a sealed bearing instead of O-rings so as to decrease the sliding torque produced by the rotation of the shaft. The front surface of the sealed bearing can be covered to thereby prevent moisture and salts from entering the interior of the sealed bearing.

The present invention provides a new and improved temperature responsive fluid coupling device which includes a sealed bearing for rotatably supporting a shaft on the front side wall of an output coupling member and a cover plate or slinger which is positioned in front of the sealed bearing so as to cover the sealed bearing and protect the same from an accumulation of moisture and salts.

The foregoing and other objects, features and advantages of the invention will become apparent from the following more particular description of a preferred embodiment of the invention as illustrated in the accompanying drawings.

BRIEF DESCRIPTION OF THE DRAWINGS

FIG. 2 is a partial cross sectional view of a temperature responsive fluid coupling device according to one embodiment of the present invention.

FIG. 3 is an end view of the coupling device as viewed in the direction of the arrow A in FIG. 2.

FIG. 4 is a partial cross sectional view of a temperature responsive fluid coupling device according to another embodiment of the present invention.

DETAILED DESCRIPTION OF THE INVENTION

Figure 1:
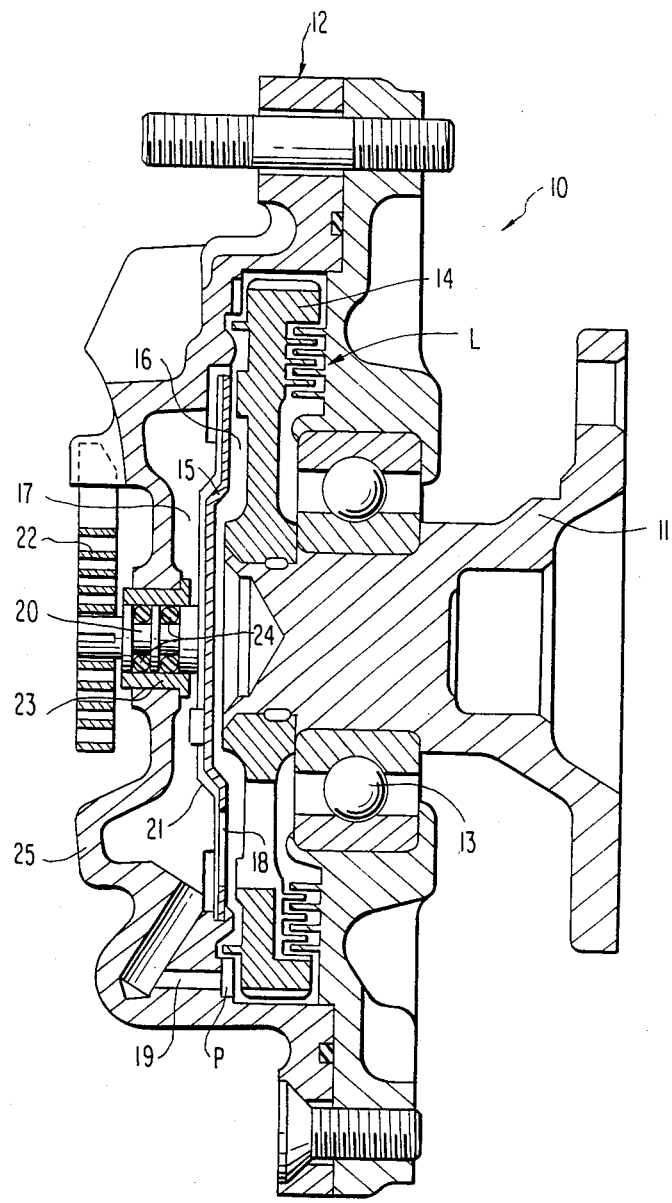
FIG. 1 is a cross sectional elevation view of a conventional temperature responsive coupling device.

A temperature responsive fluid coupling device 30 according to one embodiment of the present invention is shown in FIG. 2. The coupling device 30 includes a stub shaft 31 extending through the front side wall 32 of the output coupling member 33. A valve plate 34 is connected to the right end of the shaft 31 as viewed in FIG. 2. A bimetal spiral spring 35 is mounted on the front side surface of the output cover 33 so as to be subjected to the changes in temperature of the heated air from the radiator of an internal combustion engine. An inner end 35a of the bimetal spring 35 is secured to the left end of the shaft 31 as viewed in FIG. 2, while the outer end of the bimetal spring 35 is secured to the output coupling member 33. The shaft 31 is rotatably supported in an aperture in the front side wall 32 of the output coupling member 33 by means of a sealed bearing 36 having an inner race and an outer race. A cover plate or slinger 37 is positioned in front of the sealed bearing 36 and is secured to the front side wall 32 together with the bearing 36 by means of a rolled metal protrusion overlapping the flange of the cover plate. The cover plate 37 is provided with at least one drip hole 31 adjacent the protrusion 38. Four drip holes have been shown in the embodiment of FIG. 3. Accordingly, even if the moisture enters into the cover plate 37, the moisture will be removed through the drip holes 39 by centrifugal force during the rotation of the output coupling 33.

Another embodiment of the invention is shown in FIG. 4 wherein a cover plate or slinger 40 is provided with an internal flange press fitted on the shaft 31 adjacent the inner race of the bearing 36. A gap 42 is provided between the outer circumferential portion of the cover plate 40 and the front side wall 32 with the result that there is no need to form drip holes in the cover plate 40. The moisture may be removed from the gap 42 by the centrifugal force action during the rotation of the output cover member 33.

While the invention has been particularly shown and described with preferred embodiments thereof, it will be understood by those in the art that the foregoing and other changes in form and details may be made therein without departing from the spirit and scope of the invention.

What is claimed is:

1. A temperature responsive fluid coupling device for driving a cooling fan for an internal combustion engine comprising an input coupling member driven by said engine, an output coupling member having a hollow interior rotatably mounted on said input coupling member, a rotor secured to said coupling member and located in said hollow interior of said output coupling member, a partition plate dividing said hollow interior into a working chamber accommodating said rotor therein, and a reservoir chamber for a viscous fluid, a fluid return passage formed in said partition plate for permitting flow of said viscous fluid from said reservoir chamber to said working chamber, a pumping passage disposed in said output coupling member radially outwardly of said partition plate, and pumping means associated therewith for directing said viscous fluid from said working chamber to said reservoir chamber, a shaft rotatably supported in said output coupling member coaxially with said input coupling member by means of a sealed bearing, a valve plate secured to one end of said shaft for rotation on said partition plate to control the fluid communication through said fluid return passage therein a bimetal spiral spring secured at the outer end thereof to said output coupling member so as to be subjected to changes in temperature, and secured at the inner end thereof to the other end of said shaft, and cover plate means secured to one of said output coupling member and said shaft and positioned in front of said sealed bearing outside of said output coupling member and having moisture passage means adjacent said output coupling member.

2. A temperature responsive fluid coupling device according to claim 1 wherein said cover plate means is secured to said output coupling member adjacent said sealed bearing by means of a rolled metal flange.

3. A temperature responsive fluid coupling device according to claim 2 wherein said moisture passage means is comprised of drip hole means in said cover plate means adjacent said rolled metal flange.

4. A temperature responsive fluid coupling device according to claim 1 wherein said cover plate means is pressed on said shaft adjacent said sealed bearing.

5. A temperature responsive fluid coupling device according to claim 4 wherein said cover plate means comprises a disc portion disposed in overlying spaced relation to said sealed bearing with a gap being provided between the outer circumferential portion of said disc portion and said coupling member to define said moisture passage means.

* * * * *